United States Patent [19]

Savage

[11] 4,112,618
[45] Sep. 12, 1978

[54] METHOD AND APPARATUS FOR SELECTIVELY PREVENTING OR PERMITTING SYSTEMIC SAP FLOW TO CONTROL BUD FORMATION

[76] Inventor: Bobbie O. Savage, P.O. Box 2434, Farmington, N. Mex. 87401

[21] Appl. No.: 823,473

[22] Filed: Aug. 10, 1977

[51] Int. Cl.$^2$ .................................................. A01G 15/00
[52] U.S. Cl. ............................................ 47/58; 47/1 R
[58] Field of Search ............................. 47/2, 58, 24, 1

[56] References Cited

U.S. PATENT DOCUMENTS

| | | | |
|---|---|---|---|
| 42,176 | 4/1864 | Fisher | 47/58 |
| 1,442,367 | 1/1923 | Stevens | 47/58 X |
| 2,122,734 | 7/1938 | Winford | 47/24 |
| 3,890,740 | 6/1975 | Miller | 47/58 |

*Primary Examiner*—Robert E. Bagwill
*Attorney, Agent, or Firm*—Karl W. Flocks

[57] ABSTRACT

A method and apparatus for mechanically selectively preventing or permitting systemic sap flow in trees to prevent premature out-of-season bud formation, particularly in fruit trees, when unreasonably warm spells would promote flow of tree sap and consequently formation of premature buds which in the ordinary course of event will suffer kill back and result in serious tree damage upon reversion to normally cold weather, the method comprising cutting all around the body of a tree at a selected section from the bark to around the outer edge of heartwood; inserting at least a pair of perforated members in the cut area to both prevent healing and closing of the cut and to permit flow of sap when desired and at least a pair of members for cooperation with the perforated members to permit flow of sap through the perforations thereof or to block up the perforations to prevent flow of sap therethrough. The apparatus for controlling bud formation comprises at least a pair of hinged units having perforations therethrough and a pair of members selectively conditioned to prevent or permit flow communication of sap through the perforations and between sap-carrying cells of the tree to thereby control bud formation.

12 Claims, 8 Drawing Figures

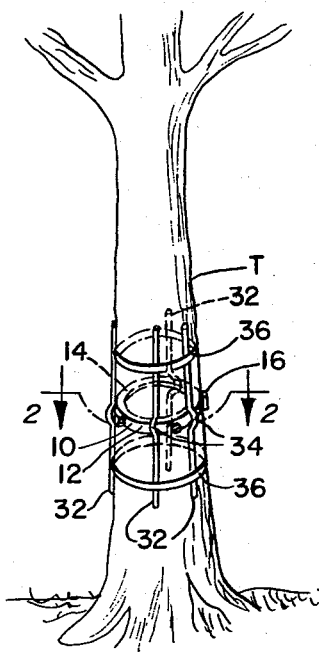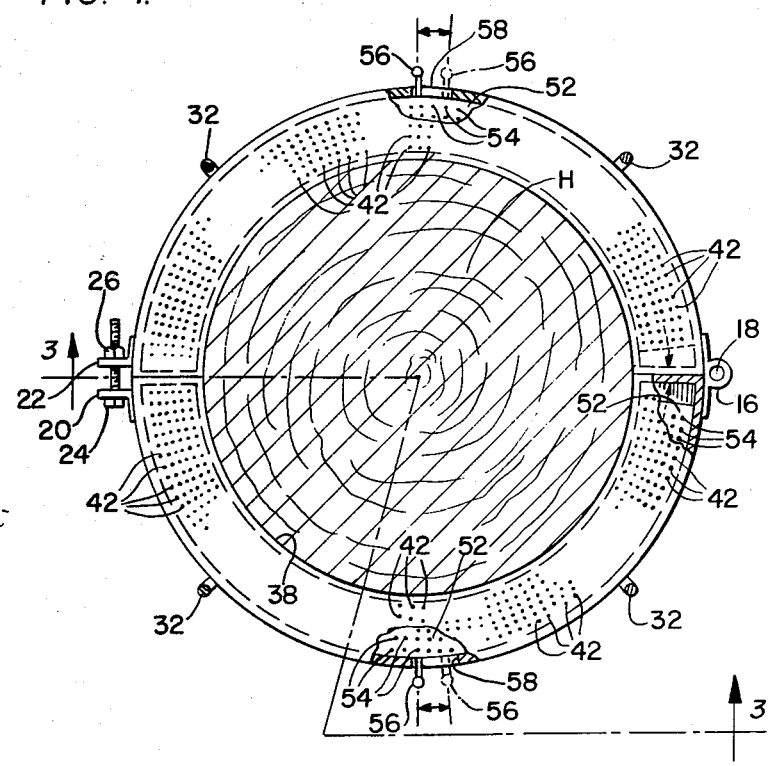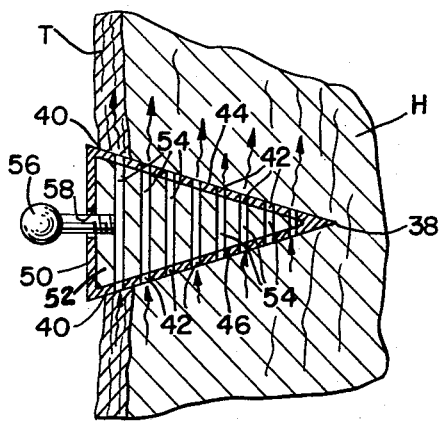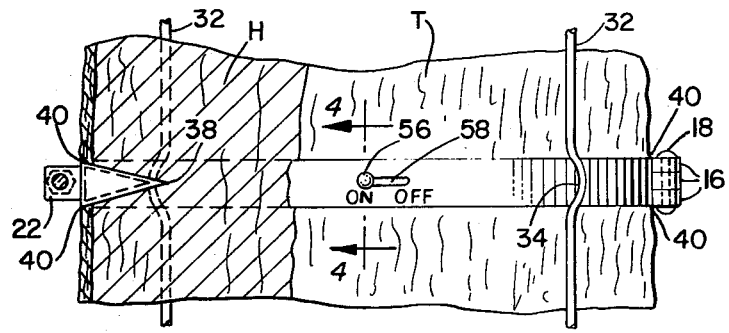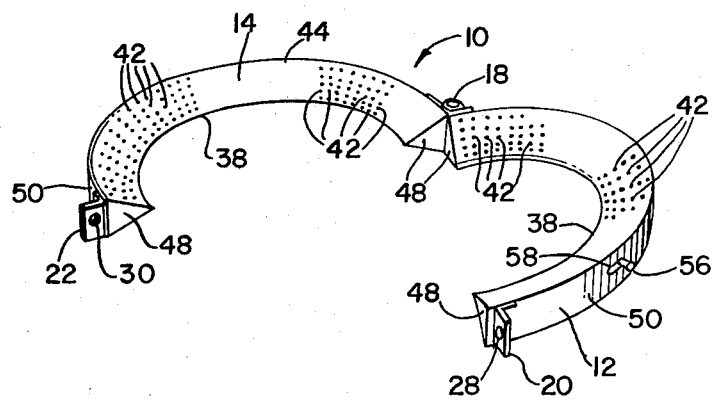

METHOD AND APPARATUS FOR SELECTIVELY PREVENTING OR PERMITTING SYSTEMIC SAP FLOW TO CONTROL BUD FORMATION

BACKGROUND OF THE INVENTION

1. Field of the Invention

The field of the invention is believed to be best exemplified by art which may be found in Class 47, Subclasses 2 and 8.

2. Description of the Prior Art

The problem of premature bud formation due to unseasonable warm spells in the winter followed by normal cold weather and the resulting damage to fruit trees is well-known to any orchard operator. Numerous techniques have heretofore been attempted and suggested for preventing premature bud formation to provide the tree with a measure of protection against kill back which is extremely costly to the orchard operator. It has been long recognized that temporary warm spells in the winter season will arouse a tree from its dormancy and cause sap to flow through the tree's system and are thus conducive to premature bud formation which renders the tree highly susceptible to kill back upon resumption of normally cold weather. As a result of this problem many attempts have been made to protect trees from premature bud formation. Some of the prior art techniques to protect trees from premature bud formation include:

1. Maintaining the tree in chilled condition by packing "dry ice" around the tree during temporary warm spells of winter so that the tree will not be influenced by the temporary warm weather;
2. Maintaining the tree in chilled condition by a refrigerating system in which coolant is circulated through a coil of many turns around the tree during such temporary warm spells to maintain the tree's dormancy;
3. Heating orchards by burning tires, oil or other materials in open pots or the like;
4. Spraying water on trees during freezing temperatures;
5. Covering fruit trees with a foam or fog to minimize radiation heat losses from the tree or surrounding soil.

While a measurable degree of success is achieved from use of the methods enumerated above, these methods are accompanied by various disadvantages compared to the use of the method and apparatus according to the present invention. In each of the methods mentioned above, it is necessary to have a supply of energy or other resource to carry out the specific method. For example, according to the prior art methods, it is necessary to have a supply of "dry ice"; a refrigerent which must be circulated and thus require energy; oil or other fuel; water for spraying and the pressure energy necessary to perform the spraying; and foam or fog and the energy to apply these. The prior art methods also require either mechanical or human means for applying the resources according to temperature changes each time unseasonable warm spells appear, that is means for monitoring and effecting the preventative that is desired to avoid premature formation of buds.

Applicant hereby brings to the attention of the Patent Office the following prior art of which he was aware at the time of the preparation of the instant application:

U.S. Pat. No. 1,583,625 — STUBING, SR.
U.S. Pat. No. 1,799,699 — PEETS
U.S. Pat. No. 2,122,734 — WINFORD
U.S. Pat. No. 3,890,740 — MILLER

Of the above art, Stubing, Sr. and Peets are of interest in that they relate to methods and/or devices for tree surgery. These patents relate essentially to the care and healing of sick or diseased trees. The Winford and Miller patents relate to methods and/or apparatuses which are for use in preventing premature formation of buds. Winford specifically relates to a localized application of "dry ice" otherwise known as solidified carbon dioxide around a tree so that the tree will not sense the temporary warmth in the winter so that the tree will remain dormant and its sap will not flow through the system to form buds. Miller, on the other hand, relates to a more sophisticated method of localized chilling of the senses of a tree by circulating refrigerant through coils around the trunk of a tree to prevent sap flow during winter warm spells.

The foregoing prior art patents are noted as being of interest, but are not deemed to constitute a barrier to the patentability of the present invention.

SUMMARY OF THE INVENTION

The present invention relates to a mechanical method and/or apparatus for preventing premature formation of buds on trees during momentary unexpected warm spells in the winter.

More specifically, the present invention relates to a method and/or apparatus for preventing flow of tree sap through the tree's system by mechanical valve-like means.

Another object of this invention is to provide means which may be selectively conditioned to prevent flow of tree sap for the entire winter season so that the tree will not form buds until sap is permitted to flow after the last frost of the winter and early spring seasons have passed.

Still another object of this invention is to provide a method and/or apparatus for preventing sap flow which requires no cooling medium which may dissipate and require replacement.

It is yet another object of this invention to provide means for preventing tree sap flow which requires no monitoring, no energy or power requirements.

Still another object of this invention is to provide means for preventing tree sap flow requiring no refrigerant, no fuel, no water or any other consumable resource of nature.

According to the present invention means are provided for cutting through and all around the bark of a tree at a selected location to the depth around the outer edge of the tree's heartwood and inserting means therein for selectively being conditioned to prevent or to permit flow of tree sap as may be desired. It is known that in the winter season trees are dormant with little or no sap flowing through their systems so that no buds will normally be formed, unless there is a temporary warm spell and that buds formed during such temporary warm spells are extremely vulnerable to kill back when the weather turns cold as would be expected. Such kill back of premature buds is extremely harmful to a tree as it has little or no time to manufacture replacement sap and carbohydrates consumed in the process of forming the buds since photosynthesis does not take place without leaves to receive the reduced sun light that is available in the winter. While the prior art methods have endeavored to retard sap flow by establishing cold conditions so that the tree will not sense temporary ambient warmth in the winter, the present invention relates to positively stopping or preventing flow from taking place by actually blocking off the flow passages. The present invention is in contrast to prior methods of protecting trees by inducing the tree to remain cold and dormant or to warm the tree to protect premature buds.

The present invention relates to an actual severing of the tree sap-carrying cells, interposing means between the severed portions of the sap-carrying cells, which means may be selectively conditioned to prevent or to permit sap flow communication between the severed portions of the sap-carrying cells. In practice the means interposed between that severed portions of the sap-carrying cells are conditioned to prevent or block-off the severed portions of the sap-carrying cells from sap flow communication during the cold season and are conditioned to permit sap flow communication therebetween after the winter season or after the last expected frost.

The method according to the present invention is best initiated after the inception of dormancy when sap would not be flowing so that a minimum of sap would be lost due to "bleeding" during the incision through the bark and through sap-carrying cells. The incision is made all around and through the bark at a selected location to a depth around the outer edge of the tree's heartwood. The valve means is interposed within the incision to the depth around the outer edge of the heartwood. The valve means is conditioned to prevent sap flow communication between the severed portions of the sap-carrying cells. The process is to further include portions of the valve means protruding at least slightly outwardly of the bark and the application of grafter's tar on the bark around the incision to prevent any "bleeding" of sap from the tree. The apparatus according to the invention is to include both perforated and imperforated members which are to be inserted to form the sap flow control valve. Alternatively, the valve means may include a plurality of perforated members which when inserted into the incision in the tree may be conditioned so that the perforations are in alignment to permit flow of sap therethrough or out of alignment to prevent flow of sap through the tree's system. As a further alternative of the valve means, interchangeable perforated and imperforated disk members may be used apart from each other to permit or prevent sap flow.

BRIEF DESCRIPTION OF THE DRAWINGS

Several embodiments of the instant invention are illustrated in the accompanying drawings in which:

FIG. 1 is an elevational view of a tree in which the instant invention has been installed to control the sap flow thereof;

FIG. 2 shows on an enlarged scale a view with portions broken away and taken through section 2—2 of FIG. 1;

FIG. 3 is a view taken through section 3—3 of FIG. 2;

FIG. 4 shows on a further enlarged scale a view taken through section 4—4 of FIG. 3;

FIG. 5 shows on an intermediate scale a perspective view of the sap-flow control apparatus according to the present invention prior to installation;

DETAILED DESCRIPTION OF THE INVENTION

Figure 6:
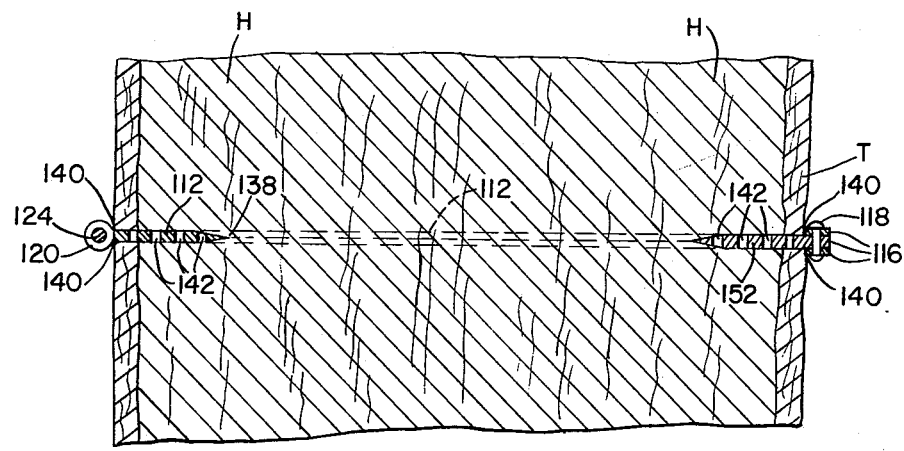
FIG. 6 shows a sectional view similar to FIG. 3 of an alternative embodiment according to the present invention to permit flow of sap through the tree's system.

Referring now to the drawings with greater particularity to FIGS. 1-5, details and operation of the apparatus and the method carried out by its installation in a tree will be readily appreciated by the reader. FIG. 1 shows a sap-flow control valve 10 installed on a tree T. The valve 10 as more clearly illustrated in FIGS. 2 and 5 is self-contained and comprises two semi-annular shell portions 12 and 14 hingedly connected together by aligned eyelets 16 integrally formed thereon and a pivot pin 18 extending therethrough. Each semi-annular portion 12 and 14 includes a radially outwardly extending clamping flanges 20, 22, respectively, and lock bolt 24 and nut 26, with the bolt being adapted to extend through holes 28, 30 of flanges 20, 22, respectively, whereby nut 26 may be threaded on bolt 24 to lock control valve 10 securely after installation thereof in tree T. To further ensure security of installation of sap-flow control valve 10 on tree T, a plurality of rods 32 with an intermediate arcuate portions 34 to accomodate the outer periphery of valve 10 may be located around tree T. The rods 32 are secured adjacent to opposite ends thereof by straps or cords 36. According to the method of using the valve apparatus 10, an incision must be made through a selected portion of the trunk of a tree T, entirely around the trunk to the depth of the outer edge of heartwood H of the tree, after which the valve apparatus 10 is interposed into the incision to surround and prevent healing of the incision. The installation is preferably made after the cold season has set in and the tree T is dormant so that "bleeding" of sap due to the incision is minimized. To facilitate the operation of making an incision on the tree T the inner radial periphery of each semi-annular portion 12, 14 is formed with a knife edge 38 which upon application of increasing pressure on nut 26 and bolt 24 will increase pentration of knife edges 38 toward the heartwood H. Only sufficient pressure should be applied so that knife edges 38 will reach the outer edge of heartwood H as may be estimated from the size and age of the tree T.

After the incision is made and valve apparatus 10 is interposed in the incision in tree T, grafter's tar is applied to the tree T in the areas 40 where valve apparatus 10 protrudes outwardly from tree T to prevent sap "bleeding" thereat.

Each semi-annular valve portion 12, 14 is provided with a plurality of perforations 42 in upper and lower faces 44, 46 thereof, which may be conditioned to permit sap-flow therethrough. Each semi-annular valve portion 12, 14 may be closed by end walls 48 and a radially outer, circumferentially extending wall 50. Contained within faces 44, 46 and walls 48, 50 of each valve portion 12, 14 is a control member 52. Each control member 52 is formed from a solid member comprising a plurality of through bores 54 which as may be seen in FIG. 4 is conditioned so that such bores 54 are in alignment with perforations 42 which are also in alignment in upper and lower faces 44, 46 whereby severed portions of sap-carrying cells of tree T are in sap-flow communication, a condition which would be desired in the growing season. It is to be understood that each control member 52 may be conditioned so that the perforations 42 of upper face 44 will not be in sap-flow communication with perforations 42 of lower face 46, this being readily achieved in valve 10 by shifting control members 52 so that through bores 54 are out of alignment with perforations 42. To facilitate selectively conditioning control members 52, each is provided with a radially outwardly extending handle 56 which extends through a circumferentially extending slot 58 in the circumferentially extending wall 50 of such length as to permit shifting control members between sap-flow and non-sap-flow conditions indicated by two-headed arrows in FIG. 2. In an optimum arrangement control members 52 would be in tight fitting relationship within the shell of semi-annular portions 12, 14 so that sap will not flow therethrough when control member 52 is in the off position, which off position would be maintained throughout the winter season so that no sap will flow through the system of the tree T during the dormant season thereof even when there are temporary warm spells. Control members 52 would be selectively adjusted to the on position to allow sap flow only after the last frost for the growing season.

Figure 7:
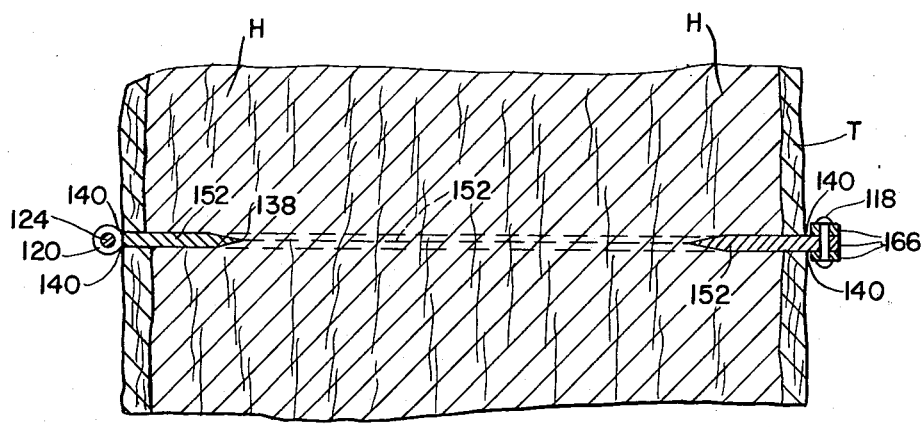
FIG. 7 shows a sectional view similar to FIG. 6 with a member installed in the tree to prevent flow of sap.

FIGS. 6 and 7 show an alternative embodiment of the invention wherein the concept of the present invention includes the separate installation of replaceable semi-annular disk members 112 and 152. Each semi-annular disk member 112, 152 is hingedly connected to a like member by way of eyelets 116 and a pivot pin 118. Each semi-annular disk 112, 152 also is provided with a knife edge 138 at the inner periphery and clamping eyelets 120 at the outer radial periphery thereof. The method of applying the semi-annular disks 112, 152 is preferably practiced during a tree T's dormant season and at which time semi-annular disk member 152 is applied with clamping means in the form of a bolt 124 and a nut not shown to help urge knife edge 138 thereof to penetrate the tree T to the outer edge of the tree T's heartwood H. Grafter's tar is then applied in the areas 140 where semi-annular disk members 112 or 152 protrude out of the bark of tree T to prevent sap "bleeding". Semi-annular disk members 152 are of solid plate construction so that the severed remains of the sap-carrying cells of tree T will not be in sap-flow communication whereby no buds will form during temporary warm spells in the winter. In the normal warm or growing season, semi-annular disk members 152 will be replaced by semi-annular disk members 112 which are formed with a plurality of perforations 142 which will allow sap-flowing communication through perforations 142 between severed sap-carrying cells. Grafter's tar should also be applied to the areas 140 where semi-annular disk members 112 protrude out of the bark of tree T so that sap will not bleed externally therefrom. With perforated disk members 112 installed in tree T, the incision made in the tree will not close up and these disks 112 and 152 may be selectively installed in place, one for the other as desired, to permit flow or to prevent flow of sap through the tree's system.

Figure 8:
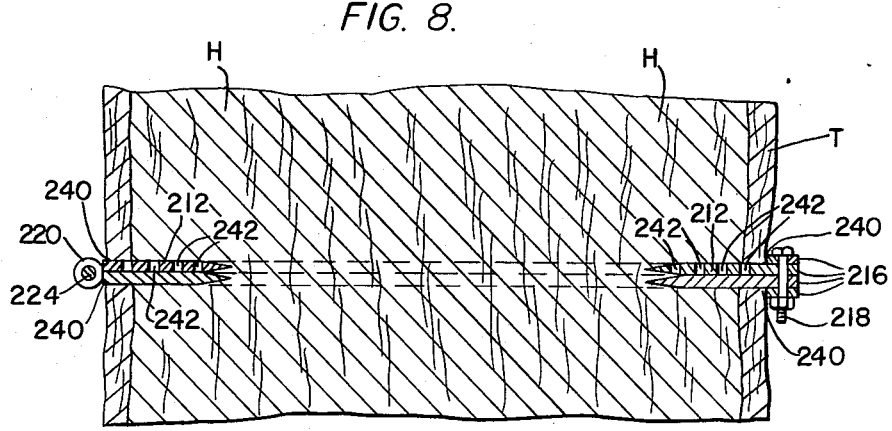
FIG. 8 is a sectional view similar to FIGS. 6 and 7 showing a further alternative installation according to the present invention.

FIG. 8 shows a further alternative embodiment of the invention wherein the concept of the present invention includes the combined installation of two pairs of semi-annular disk members 212 and 252. Each pair of semi-annular disk members 212, 252 are hingedly connected to like pair of semi-annular disk members 212, 252 by way of eyelets 216 and a pivot pin 218. Each pair of semi-annular disk members 212, 252 also are provided with knife edges 238 at the inner periphery and clamping eyelets 220 at the outer radial periphery thereof. The method of applying the pairs of semi-annular disks 212, 252 is preferably practiced during a tree T's dormant season and at which time semi-annular dis members 252 are applied with clamping means in the form of a bolt 224 and a nut not shown to help urge knife edge 238 thereof to penetrate the tree T to the outer edge of the tree T's heartwood H. Grafter's tar is then applied in the areas 240 where semi-annular disk members 212, 252 protrude out of the bark of tree T to prevent sap "bleeding". Semi-annular disk members 252 are of solid plate construction so that the severed remains of the sap-carrying cells of tree T will not be in sap-flow communication whereby no buds will form during temporary warm spells in the winter. In the normal warm or growing season semi-annular disk members 252 will be replaced by a second pair of semi-annular disk members 212. Both pairs of semi-annular disk members 252 are formed with a plurality of perforations 242 which will allow sap-flowing communication through such perforations 242 between severed sap-carrying cells. Grafter's tar should also again be applied to the areas 240 where semi-annular disk members 212 protrude out of the bark of tree T so that sap will not bleed externally therefrom.

The arrangement in FIG. 8 is thus understood to be selectively conditioned by replacing solid plate forms 252 with a second set of perforated semi-annular disk members 212 to permit sap flow in the tree T's growing season.

It will be obvious to those skilled in the art that various changes may be made without departing from the scope of the invention and the invention is not to be considered limited to what is shown in the drawings and described in the specification.

What is claimed is:

1. Method for preventing premature bud formation in a tree when its dormancy is interrupted by unseasonably warm weather which would promote flow of tree sap and consequently premature formation of buds which upon resumption of cold weather would be subjected to kill back and result in severe damage to the tree, wherein said method comprises the steps of:
   (a) cutting all around and through the bark and sap-carrying cells of a tree to the outer edge around the tree's heartwood;
   (b) interposing means within the area between the cut portions of sap-carrying cells which may be selectively conditioned to prevent or permit sap-flow communication between the remains of the cut portions of sap-carrying cells; and
   (c) sealing the periphery of the tree in the area around the cut with grafting tar to inhibit loss of sap.

2. The method according to claim 1 wherein said step (b) comprises interposing self-contained means which are selectively conditionable between preventing and permitting sap-flow communication between the remains of the cut portions of sap-carrying cells.

3. The method according to claim 2 wherein said step (b) comprises interposing self-contained means which may be continuously retained interposed between the cut portions during both the normal growing cycle and the dormancy period of the tree.

4. The method according to claim 1 wherein said step (b) comprises interposing members within the cut area between the cut portions of sap-carrying cells to prevent sap-flow communication between the remains of the cut portions of sap-carrying cells during the dormancy of the tree and replacing such members with members which will permit sap-flow communication between the remains of cut portions of sap-carrying cells in growing cycle of the tree but will prevent healing-up and closing of the cut area.

5. Apparatus for preventing premature bud formation comprising at least two arcuate units adapted to be interposed in a generally horizontal section cut around the periphery of a tree and into an area around the outer edge of heartwood of the tree, each of said units including perforated means permitting sap-flow communication between sap-carrying cells if desired and means which may be selectively conditioned to block perforations of said perforated means to prevent sap-flow communication or to be clear of the perforations of said perforated means to permit sap-flow communication between sap-carrying cells through said perforated means.

6. The apparatus as defined in claim 5 wherein each of said units comprises a hollow and generally wedge shape shell in cross section with a pair of sides having aligned perforations and a closure member disposed within said shell, said closure member being of solid construction and of close fit within said shell and further having a plurality of vertically extending bores therein, said closure member having a radially outwardly extending handle, said shell having a slot in its periphery through which said handle extends and may be shifted to cause said bores to be in alignment with said perforations or to be out of alignment with said perforations.

7. The apparatus as defined in claim 6 wherein said apparatus comprises two of said units with said units being hingedly connected at one pair of adjacent ends thereof and radially extending securing flanges at opposite adjacent ends thereof, each of said flanges having an aperture therein through which clamping means may be secured in use of said apparatus.

8. The apparatus as defined in claim 7 wherein each of said units includes a knife edge along its inner radial edge.

9. The apparatus as defined in claim 5 wherein each of said units include a perforated semi-annular disk portion and an imperforated semi-annular disk portion, said perforated and imperforated disk portions being implanted in superimposed position within the sap-carrying cell area of a tree to prevent flow of sap between sap-carrying cells.

10. The apparatus as defined in claim 9 wherein said imperforated semi-annular disk portions are omitted from each of said units when said units are used to permit sap-flow communication between sap-carrying cells.

11. The apparatus as defined in claim 10 wherein each of said perforated semi-annular disks is formed with a knife edge along the radially inner periphery thereof.

12. The apparatus as defined in claim 11 wherein said perforated semi-annular disks are hingedly connected at one pair of adjacent ends and include securing means at opposite ends therefrom.

* * * * *